Patented Oct. 28, 1952

2,615,873

UNITED STATES PATENT OFFICE 2,615,873

COPOLYMERS OF VINYLIDENE CYANIDE WITH ALIPHATIC CONJUGATED DIOLEFINS

Seward J. Averill, Boston, Ohio, assignor to The B. F. Goodrich Company, New York, N. Y., a corporation of New York No Drawing. Application April 29, 1950, Serial No. 159,147

9 Claims. (Cl. 260—78.5)

This invention relates to the preparation of novel copolymers of vinylidene cyanide with aliphatic conjugated diolefins, which copolymers are extremely useful synthetic resins, especially in the preparation of filaments and films.

In U. S. Patent 2,476,270 to Alan E. Ardis, and in copending applications, Serial No. 63,434 filed December 3, 1948, now U. S. Patent 2,502,412, and Serial No. 79,712 filed March 4, 1949, now U. S. Patent 2,514,387, novel methods for the preparation of monomeric vinylidene cyanide are disclosed. In another copending application, Serial No. 11,336, filed February 26, 1948, methods for the preparation of useful copolymers of vinylidene cyanide are disclosed.

Monomeric vinylidene cyanide is a clear liquid at room temperature and a crystalline solid at 0° C. It melts in the range of 6.0° C. to 9.7° C., depending on purity, with purest samples melting at 9.0° C. to 9.7° C. and its boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3, it reacts therewith in the Diels-Alder reaction to give solid 4,4-dicyanocyclohexene.

It has now been discovered that when monomeric vinylidene cyanide of the above physical and chemical characteristics is copolymerized with an aliphatic conjugated diolefin in a polymerization medium comprising a liquid solvent for the monomers, said liquid solvent being present in an amount in excess of 70% by weight of the total solution, and in the presence of a free radical polymerization catalyst, new and highly useful copolymers are obtained. This result is somewhat surprising since monomeric vinylidene cyanide exhibits a very strong tendency to form a Diels-Alder type aduct when admixed with aliphatic conjugated diolefins.

The copolymers obtained in accordance with this invention are essentially 1:1 alternating copolymers, that is, copolymers possessing the structure:

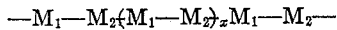

wherein each $M_1$ is a vinylidene cyanide unit

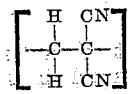

each $M_2$ is a unit of an aliphatic conjugated diolefin, and $x$ is a polydigit number, preferably from 70 to 8,000.

The fact that the copolymers thus obtained are essentially 1:1 alternating copolymers is determined by nitrogen analysis of the copolymer which shows that the two monomers enter the polymer chain in essentially equimolar ratios regardless of the degree of monomer to polymer conversion and of charging ratio. Further supporting evidence for this fact is found in the copolymerization equation of F. M. Lewis, C. Walling et al., Journal of the American Chemical Society, vol. 70, page 1,519 (1948):

$$\frac{d[M_1]}{d[M_2]} = \frac{[M_1]}{[M_2]} \cdot \frac{r_1[M_1]+[M_2]}{r_2[M_2]+[M_1]}$$

wherein $M_1$=the concentration of unreacted monomer $M_1$.
$M_2$=the concentration of unreacted monomer $M_2$.
$r_1$=the ratio of the rate constants for the reaction of an $M_1$ type radical with $M_1$ and $M_2$ respectively.
$r_2$=the ratio of the rate constants for the reaction of an $M_2$ type radical with $M_2$ and $M_1$ respectively.

When the product of $r_1$ and $r_2$ (the values of $r_1$ and $r_2$ being determined by solving the equation above for $r_1$ and $r_2$) is equivalent to 0, a 1:1 alternating copolymer is formed, that is, a copolymer having the

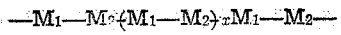

structure shown hereinabove. It has been found that the product of $r_1$ and $r_2$ as calculated for the vinylidene cyanide-aliphatic conjugated diolefin copolymer system is substantially 0, so that the equation clearly indicates that an essentially alternating copolymer is formed.

Any aliphatic conjugated diolefin may be copolymerized with vinylidene cyanide in accordance with this invention. Included within this class of compounds are butadiene-1,3, 2-methyl butadiene-1,3, piperylene, 2,3-dimethyl butadiene-1,3, 1,2-dimethyl butadiene-1,3, 1,3-dimethyl butadiene-1,3, 1-ethyl butadiene-1,3, 1,4-dimethyl butadiene-1,3, 2-neopentyl butadiene-1,3, 2-methyl pentadiene-1,3, and the like. Because it is readily available in commercial quantities and at relatively low cost, butadiene-1,3 itself is the preferred conjugated diene for use in the polymerization process. However, the other aliphatic conjugated diolefins disclosed herein may also be used with generally equivalent results.

The preferred mode of operation of the polymerization process consists in dissolving the monomers in the solvent, adding a free radical polymerization catalyst and then heating the resulting solution, whereupon polymerization occurs to form the desired 1:1 alternating copolymer which precipitates from the polymerization medium. The copolymer is recovered simply by filtering or if desired the polymerization medium can be evaporated. The use of polymerization temperatures in the range of 30° C. to 80° C. is preferred, but not at all critical, since polymerization will occur at temperatures as low as 0° C., or as high as 100°. If desired, fresh quantities of one or both of the monomers, and also of catalyst and solvent may be added either continuously or intermittently, to the polymerization mixture during the course of the polymerization, thus taking fullest advantage of the capacity of the equipment and in effect operating a continuous or semi-continuous process.

The nature of the liquid solvent is likewise not critical. For economical reasons, however, benzene is preferred, but other liquid aromatic hydrocarbons, including toluenes, xylenes, propylbenzene, butyl benzene, amylbenzene, as well as aliphatic solvents such as dichloroethane, trichloroethane, chlorobutane, and the like may also be used with good results. It is to be understood, of course, that the aromatic hydrocarbon must comprise in excess of 70% by weight of the total polymer solution. Otherwise, the Diels-Alder type adduct referred to hereinabove will be formed to the exclusion of the desired copolymer.

The free radical catalyst which is utilized in the polymerization process is preferably a peroxygen compound such as silver peroxide, the perborates, the percarbonates, benzoyl peroxide, caprylyl peroxide, lauroyl peroxide, acetone peroxide, acetyl benzoyl peroxide, cumene hydroperoxide, ortho, ortho'-dichlorobenzoyl peroxide, ortho, ortho'-dibromobenzoyl peroxide, caprylyl peroxide, pelargonyl peroxide, tertiary butyl hydroperoxide, and the like. In general from 0.1 to 5% by weight of the catalyst is utilized although smaller or larger amounts may be utilized if desired.

The following examples illustrate the preparation of copolymers of vinylidene cyanide with conjugated aliphatic diolefins in accordance with this invention, but are not to be construed as a limitation upon the scope thereof, for there are, of course, numerous possible variations and modifications. In the examples all parts are by weight.

EXAMPLES I TO IV

Vinylidene cyanide and various aliphatic conjugated diolefins are copolymerized by first dissolving the monomers in benzene, adding ortho, ortho'-dichlorobenzoyl peroxide as the polymerization catalyst, and then heating the resulting solution at about 40° C. for varying periods of time depending upon the particular conjugated aliphatic diene which is utilized. The charging ratios, mole per cent vinylidene cyanide in the polymer, and other pertinent data are included in the table below.

*Table*

| Example | I | II | III | IV |
|---|---|---|---|---|
| Diolefin | Butadiene-1,3 | 2-Methyl Butadiene-1,3 | Pentadiene-1,3 | 2-Methyl Pentadiene-1,3 |
| Parts Benzene | 17.6 | 20.0 | 23.7 | 17.6 |
| Weight Percent Benzene | 81.0 | 90.0 | 90.0 | 80.0 |
| Parts Vinylidene Cyanide | 2.42 | 1.18 | 1.39 | 2.19 |
| Mole Percent Vinylidene Cyanide | 50.0 | 50.0 | 50.0 | 50.0 |
| Parts Diolefin | 1.68 | 1.04 | 1.21 | 2.31 |
| Mole Percent Diolefin | 50.0 | 50.0 | 50.0 | 50.0 |
| Parts Catalyst [1] | 0.0410 | 0.0021 | 0.0026 | 0.0227 |
| Weight Percent Nitrogen in Copolymer | 21.35 | 20.51 | 17.88 | 17.62 |
| Mole Percent Vinylidene Cyanide in Copolymer | 50 | 53.7 | 46.4 | 50.3 |

[1] Ortho, ortho'-dichlorobenzoyl peroxide.

The copolymers obtained in each of the above examples are hard resinous, non-rubbery materials which are not alkali sensitive and do not melt or decompose even at temperatures as high as 200° C.

When other of the aliphatic conjugated diolefins selected from those disclosed hereinabove are substituted for the dienes in the above examples, the copolymers obtained possess properties generally equivalent to the copolymers of the examples. Likewise, when the polymerization is carried out utilizing other of the peroxygen catalysts disclosed hereinabove excellent results are achieved.

The desirable properties obtained in the copolymers of this invention render them extremely valuable in the melt spinning of filaments of any desired size and possessing unusually high tensile strength, low elongation, as well as excellent resistance to the action of alkalis and acids and many other advantageous properties. The physical properties of the filaments thus prepared can be even further enhanced by a cold drawing process. In addition to being especially useful in the preparation of filaments the copolymers of this invention are also useful in the preparation of molded objects and may be cast into excellent films.

Although specific examples of the invention have been herein described it is not intended to limit the invention solely thereto, but to include all the variations and modifications falling within the spirit and scope of the appended claims.

I claim:

1. A hard, resinous, non-rubbery copolymer of vinylidene cyanide and an aliphatic conjugated diolefin, said copolymer possessing essentially the structure

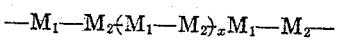

wherein each $M_1$ is a vinylidene cyanide unit of the structure

each $M_2$ is a unit of said aliphatic conjugated diolefin, and $x$ is a polydigit member, the vinylidene cyanide units in said copolymer being derived from monomeric vinylidene cyanide which is a liquid at room temperature and a crystalline solid at 0° C. having a melting point when in purest form of substantially 9.0° C. to 9.7° C., and being characterizable chemically by the ability to undergo on contact with water at room temperature an instantaneous homopolymerization reaction to give a solid, water-insoluble resin.

2. The copolymer of claim 1 wherein the aliphatic conjugated diolefin is a butadiene-1,3 hydrocarbon.

3. The copolymer of claim 1 wherein the aliphatic conjugated diolefin is butadiene-1,3.

4. The copolymer of claim 1 wherein the aliphatic conjugated diolefin is 2-methyl butadiene-1,3.

5. The copolymer of claim 1 wherein the aliphatic conjugated diolefin is pentadiene-1,3.

6. The copolymer of claim 1 wherein the aliphatic conjugated diolefin is 2-methyl pentadiene-1,3.

7. The method which comprises preparing a solution containing monomeric vinylidene cyanide, a monomeric aliphatic conjugated diolefin, a peroxygen polymerization catalyst and a solvent for the monomeric vinylidene cyanide and the aliphatic conjugated diolefin, said solvent comprising in excess of 70% by weight of the total solution, the monomeric vinylidene cyanide present in said solution being a liquid at room temperature and a crystalline solid at 0° C., having a melting point when in purest form of substantially 9.0° C. to 9.7° C., and being characterizable chemically by the ability to undergo on contact with water at room temperature an instantaneous homopolymerization reaction to give a solid, water-insoluble resin, maintaining the said solution at a temperature of 30° C. to 80° C. for a time sufficient to effect copolymerization of the said vinylidene cyanide and aliphatic conjugated diolefin and precipitation of a hard, resinous, non-rubbery copolymer of vinylidene cyanide and the aliphatic conjugated diolefin from the said solution, said copolymer possessing essentially the structure

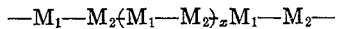

wherein each $M_1$ is a vinylidene cyanide unit of the structure

each $M_2$ is a unit of said aliphatic conjugated diolefin and $x$ is a polydigit number.

8. The method of claim 7 wherein the solvent is selected from the class consisting of aromatic hydrocarbons and halogenated aliphatic hydrocarbons.

9. The method of claim 7 wherein the solvent is benzene and the peroxygen catalyst is o,o'-dichlorobenzoyl peroxide.

SEWARD J. AVERILL.

REFERENCES CITED

The following references are of record in the file of this patent:

UNITED STATES PATENTS

| Number | Name | Date |
|---|---|---|
| 2,466,395 | Dickey | Apr. 5, 1949 |